W. O. MILLIKIN.
NUT LOCK.
APPLICATION FILED FEB. 14, 1913.

1,156,243.

Patented Oct. 12, 1915.

Witnesses
Chas. W. Stauffiger
Anna M. Dorr.

Inventor
Winfield O. Millikin,
By
Attorneys

UNITED STATES PATENT OFFICE.

WINFIELD O. MILLIKIN, OF DETROIT, MICHIGAN.

NUT-LOCK.

1,156,243.

Specification of Letters Patent.

Patented Oct. 12, 1915.

Application filed February 14, 1913. Serial No. 748,328.

*To all whom it may concern:*

Be it known that I, WINFIELD O. MILLIKIN, a citizen of the United States of America, residing at Detroit, in the county of Wayne and State of Michigan, have invented certain new and useful Improvements in Nut-Locks, of which the following is a specification, reference being had therein to the accompanying drawings.

This invention relates to improvements in nut locks and more particularly to a nut locking washer formed of sheet metal and adapted to prevent the nut from turning by the engagement of portions of the washer with the nut and with the surface against which it is forced in drawing the bolt to place.

The object of the invention is to provide a very cheap and efficient washer especially adapted for this purpose which will engage and hold the nut against retrograde turning at each small fraction of a revolution of the nut in screwing the same to a firm seat.

A further object of the invention is to provide certain other new and useful features in the construction and arrangement of the lock nut all as hereinafter more fully described reference being had to the accompanying drawing in which—

Figure 1:
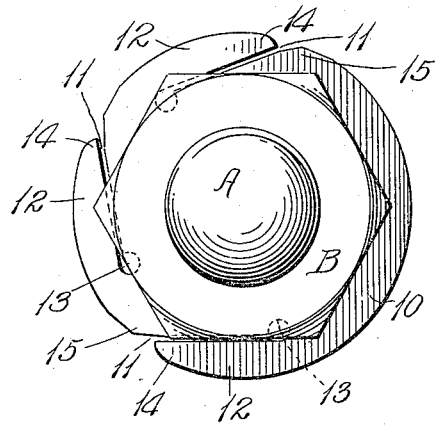
Figure 3:
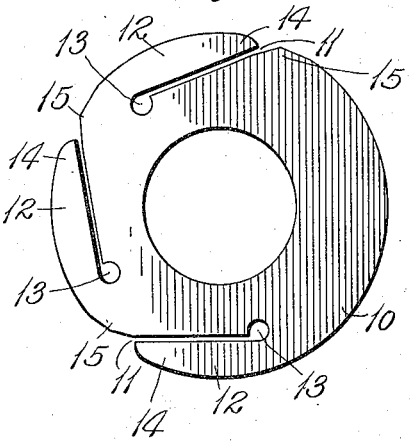
Figure 2:
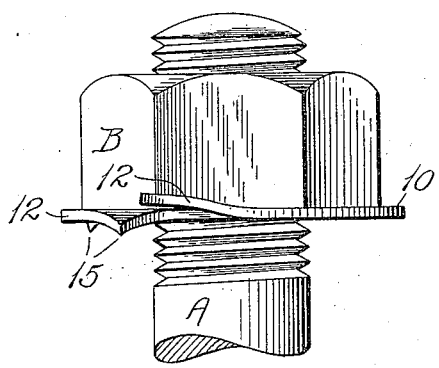
Figure 4:
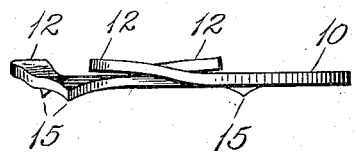

Figure 1 is an end elevation of a bolt with a nut in place thereon held by a locking device embodying the invention; Fig. 2 is a side elevation of the same; Fig. 3 is a plan view of the nut lock detached; and Fig. 4 is an edge elevation of the same.

In the drawing A represents an ordinary bolt having a screwthreaded end to receive the usual hexagonal nut B. A locking washer 10 which is preferably stamped or otherwise formed from sheet metal with an axial opening to receive the bolt A, is adapted to be placed upon the bolt beneath the nut B, between it and the surface of the member through which the bolt extends. The washer is formed with a plurality of slits 11 extending tangentially of the washer inward from its outer edge and partially severing portions of the metal therefrom to form a plurality of spring fingers 12. To prevent the metal from splitting or tearing under heavy strain at the inner ends of the slots 11, the metal is pierced at the end of each slot so that each slot terminates in a round hole 13. The sharp end of each spring finger 12 is preferably rounded off as at 14, so that the fingers when bent upwardly out of the plane of the washer will not present sharp points liable to injure the hands of the operator or catch upon material brought into contact with the washer. These spring fingers 12 which by being bent upward out of the plane of the washer form a series of spring pawls for engaging the faces or sides of the nut, are so arranged relative to said faces that but one of the fingers will be in position to engage the face of the nut at one time and the other fingers will lie partially beneath the angles of the nut, one of them in such position that a slight further turning of the nut will bring this finger into engagement with one of the faces. In the construction shown, the nut has six faces and the fingers are so arranged that one of the faces will be brought into position to be engaged by one of the fingers at every eighteenth of a revolution of the nut. The nut may, therefore, be turned up firmly to force the washer into contact with the surface of the member through which the bolt extends and locked in that position. If the nut is formed with a greater or lesser number of faces the spring fingers will be arranged accordingly so that one of the faces will be brought into engagement with a finger whenever the nut is turned a small fraction of a revolution.

The washer as above described forms the subject matter of an application for a patent filed by me in the United States Patent Office on Nov. 29, 1912, Serial No. 734,046 and is therefore not claimed in this application *per se* but only in combination with other features hereinafter described.

In my former application for patent above referred to the locking washer was provided with means for preventing the same from turning upon the bolt and therefore when the nut was engaged by the spring fingers it was held firmly against turning upon the bolt by the washer. The construction shown in the accompanying drawing is especially adapted for use upon bolts used to hold members together which are formed of wood, such as railway car frames and like constructions where the bolt will be held against turning by its engagement with the wooden frame. To prevent the washer from turning upon the face of the member against which it is forced by the nut, and thus by the engagement of its spring fingers with the faces of the nut, prevent the nut from turning, a plurality of spurs 15 are formed thereon by striking portions of the metal laterally from the washer, as by bending the sharp corners which are formed when the slots 11 are cut. These spurs extend in a direction opposite to that in which the nut is turned in turning it up on the bolt and as these spurs are struck from the spring metal they will yield and permit the washer to firmly seat upon the surface of the member through which the bolt extends, at the same time by their frictional engagement with that surface prevent the washer from turning. When the nut has been fully set up with one of its faces engaged by one of the spring fingers so that it cannot turn backward, the tendency of the washer to turn backward with the nut is overcome by the spurs which upon such backward turning will dig into the surface and firmly hold the washer. By forming these spurs upon a washer provided with spring fingers and constructed as described, a very cheap and efficient nut lock for the particular class of work for which it is designed, is secured.

Having thus fully described my invention what I claim is:—

1. As a new article of manufacture, a spring washer having a central aperture and slots extending along lines that are chords of the circumference, the resultant arms being off-set and the adjacent marginal portions of the washer in rear of said arms being pointed with the tips thereof bent oppositely to the off-set arms.

2. The combination with a threaded bolt, of a polygonal nut engaging the bolt, and a substantially circular washer having a central aperture and slots extending along lines that are chords of the circumference, the resultant arms being off-set and the adjacent marginal portions of the washer in rear of said arms being pointed with the tips thereof bent oppositely to the off-set arms for the purpose specified.

In testimony whereof I affix my signature in presence of two witnesses.

WINFIELD O. MILLIKIN.

Witnesses:
 LEWIS E. FLANDERS,
 GENEVIEVE E. McGRANN.

Copies of this patent may be obtained for five cents each, by addressing the "Commissioner of Patents. Washington, D. C."